United States Patent Office 3,150,116
Patented Sept. 22, 1964

3,150,116
SILANE MODIFIED EPOXIDE RESINS
John E. Masters, Louisville, Ky., assignor to Devoe & Raynolds Company, Inc.
No Drawing. Filed Sept. 16, 1955, Ser. No. 534,868
13 Claims. (Cl. 260—47)

This invention relates to novel silicone modified epoxide resins and more particularly to silane modified epoxide resins which are prepared by the reaction of an alkoxy, aroxy or substituted aroxy silane with epoxide resins having more than one epoxide group and at least one alcoholic hydroxyl group. The invention includes novel methods for the production of silane modified polyepoxide resins, the silane modified polyepoxide resins so produced, and compositions containing them or made therefrom.

The silane modified polyepoxide resins of this invention are useful as and in coating compositions. They produce hard, tough, flexible coatings and exhibit improved color retention or stability and crawling characteristics as compared to the unmodified polyepoxide resins.

I have found that by subjecting polyepoxide resins having more than one epoxide group and also containing hydroxyl groups to reaction with alkoxy, aroxy or substituted aroxy silanes, a reaction will take place between the hydroxyl groups of the epoxide resins and the alkoxy, aroxy or substituted aroxy groups of the silane leaving the epoxide groups unreacted, thus forming silane modified polyepoxide resins which contain free epoxide groups. The products of the present invention consist chiefly of a polyepoxide resin with ether type modifications at its alcoholic hydroxyl groups, which modifications consist of organo silanes.

The silane modified polyepoxide resins of this invention can be cured with various convertors capable of curing the unmodified epoxide resins themselves such as, amines, amides, urea-formaldehyde resins, phenol-aldehyde resins, phenolic resins, boron trifluoride complexes, polybasic acids and anhydrides, and other convertors for polymerizing or converting the epoxide resins.

A particularly advantageous convertor for the products of this invention is a phthalic anhydride half-ester. The half-ester can be made by reacting one mol of chlorohydrin with aliphatic diepoxides, or bis-phenol-epichlorohydrin resins can be used.

The silanes used for reacting with the polyepoxide resins containing hydroxyl groups include alkoxy, aroxy and substituted aroxy silanes having the general formula

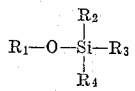

where $R_1$ is an alkyl, aryl or substituted aryl and $R_2$, $R_3$ and $R_4$ are hydrogen or alkyl, aryl, substituted aryl, alkoxy, or aroxy groups. Typical silanes which can be used are trimethyl alkoxy silane, dimethyl phenyl ethoxy silane, dimethyl diethoxy silane, diphenyl diethoxy silane, ethyl triethoxy silane, tetraethoxy silane and tetracresoxy silane.

Mixtures of various polyepoxide resins and silanes can also be used to produce useful silane modified polyepoxide resins according to this invention.

Various reacting processes can be used in the preparation of the new silane modified polyepoxide resins. The polyepoxide resin can be placed in solution by dissolving it in a solvent such as cyclohexanone together with a suitable catalyst, placed in a reaction vessel and heated with agitation to about 120° C. The silane can then be slowly added at such at rate that the temperature continues to rise. The reaction is terminated when gel particles begin to form. This method is particularly advantageous when the silane being reacted is a monoalkoxy silane.

The silane can also be blended with a solvent such as cyclohexanone, placed in a vessel and heated with agitation to about 120° C. A solution of a polyepoxide resin, using cyclohexanone as a solvent for example, together with a catalyst can then be slowly added with agitation and further heated until distillation ceases and equilibrium temperature is reached. This method has been found to be advantageous where the silane is a polyalkoxy or polyaroxy silane as it gives a more complete reaction with less tendency toward gellation.

The silane, epoxide resin, catalyst and solvent can also be placed in a reaction vessel at the same time. Heat and agitation can then be applied at such a rate that the temperature climbs very slowly and distillation proceeds uniformly. The reaction can be terminated when

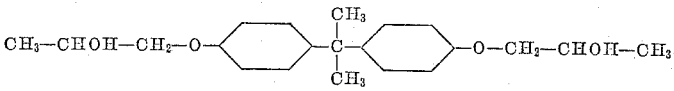

(marketed by Dow Chemical Co. under the trade name Dow X–565) to an acid value of about 175–185 with two mols of phthalic anhydride. The half-ester is advantageously used as a convertor for the silane modified polyepoxide resins of this invention in the proportion of one carboxyl group per epoxide group.

The polyepoxide resins used in accordance with this invention are polyepoxide resins containing more than one epoxide group and at least one hydroxyl group per molecule. Typical examples are polyepoxide resins, such as those obtained by the reaction of bis-phenol with epichlorohydrin or aliphatic diepoxides, such as diglycid ether, or epoxides obtained by the reaction of epichlorohydrin with polyhydric alcohols or with polycyclic diepoxide ethers, such as are described, for example, in U.S. Patent Nos. 2,582,985, 2,615,007, 2,615,088, 2,592,-560 and 2,581,464. Also epoxides prepared from the reaction of phenol terminated resins which are prepared by the reaction of an excess of dihydric phenol with epidistillation ceases and equilibrium temperature is reached. This method is advantageous for the reaction of monoalkoxy and monoaroxy silanes.

The reaction temperature may be around 120° C. or somewhat higher depending upon the process employed and the particular silane and polyepoxide resin being reacted. The time may also vary from about ½ hour to a longer time depending upon the temperature, the reactants, and the proportions of the reactants used.

The alkoxy or aroxy silanes may be reacted with the polyepoxides in various proportions according to the proportion of hydroxyl groups it is desired to modify or the amount of silicone modification desired. One limiting factor is the number of hydroxyl groups available on the polyepoxide resin, although a part only of the hydroxyl groups may be reacted with the silanes. The proportions may thus vary from proportions in which the ratio of alkoxy or aroxy groups of the silane is much less than the number of hydroxyl groups on the polyepoxides, in which case only a part of the hydroxyl groups will react, to a ratio where there are several alkoxy or aroxy groups on the silane for each hydroxyl group on the epoxide resin, in which case the reaction product will contain unreacted alkoxy or aroxy groups, and may or may not contain unreacted hydroxyl groups.

Where the monoalkoxy or monoaroxy silanes are reacted with the epoxide resins, widely varying proportions can be used, including a considerable excess of the silane which can readily be distilled from the reaction product at the end of the reaction.

When polyalkoxy or polyaroxy silanes are reacted with epoxide resins containing a number of hydroxyl groups, cross-linking can occur by reaction of the polyalkoxy or polyaroxy silanes with hydroxyl groups of different epoxy resin molecules, and if this cross-linking is carried too far, a gel is produced. Where the proportions of polyalkoxy or polyaroxy silanes and polyhydroxy epoxy resins are such that an ultimate gel is produced, care should be taken to stop the process short of the gel stage. The tendency toward gel formation in such cases is greater where the ratio of alkoxy or aroxy groups to hydroxyl groups is in the range of about 4:1 to about 6:1 than where lower or higher ratios are used.

So also, the higher the alkoxy or aroxy content of the silanes, the greater the tendency toward cross-linking between epoxide resin molecules and, to avoid the formation of a gel, care should be taken to discontinue the reaction before the gel stage.

Depending upon the proportions of polyalkoxy or polyaroxy silanes and polyhydroxy epoxy resins, and the extent of the reaction, the reaction products may contain either unreacted hydroxyl groups on the resin or unreacted alkoxy or aroxy groups or both.

Where a large excess of polyalkoxy or polyaroxy silane is used, in excess of the amount which reacts with the hydroxyl groups of the resin, the excess can be removed by distillation at the end of the process.

The reaction of the alkoxy or aroxy silanes with the polyepoxide resins can be carried out without a catalyst, but advantageously with a catalyst. Acid type catalysts have been found advantageous for the reaction, such, for example, as the styrene-acrylic acid copolymer, paratoluene sulfonic acid and other organic acid compounds such as monobasic acids, dibasic acids, acid anhydrides, etc.

The invention will be further illustrated by the following examples, but it will be understood the invention is not limited thereto. The parts are by weight.

The method used for determining the epoxide content of the epoxide resins hereinafter indicated was by heating one gram sample of the epoxide composition with an excess of pyridine containing hydrochloride (made by adding 16 cc. of concentrated hydrochloric acid per liter pyridine) at the boiling point for 20 minutes and back titrating the excess pyridine hydrochloride with 0.1 N sodium hydroxide using phenolphthalein as indicator, and considering that 1 HCl is equivalent to one epoxide group.

The silicon content was analyzed by the parr bomb method.

The term "catalyst" as used in the following examples refers to a styrene-acrylic acid copolymer prepared by the reaction of 87.8 parts styrene and 12.2 parts acrylic acid. The copolymer as used in the examples is a 45.6% solids solution in xylene/methyl isobutyl ketone before dilution with the cyclohexanone.

The epoxide resins referred to in the examples are bis-phenol epichlorhydrin resins produced by the reaction of bis-phenol with epichlorhydrin in the presence of caustic alkali, or by further reaction of low melting point epoxide resins so produced with a small amount of bis-phenol to form a higher melting point epoxide resin.

The vessel used in carrying out the following examples was a three-neck, round bottom flask, equipped with an agitator, thermometer, and reflux column connected to a down-condenser and receiver.

*Example 1.*—300 parts of an epoxide resin having an average molecular weight of about 1400, an average weight per epoxide of 897, and containing an average of 4.88 hydroxyl groups per mol, and 144 parts cyclohexanone were placed in the flask and the mixture was heated until the resin melted, cooled to 115° C. and 100 parts trimethyl ethoxy silane added. After the silane had been thoroughly mixed in, 4 parts of "catalyst" dissolved in 6 parts cyclohexanone was added. This composition represents a ratio of 3.95 mols silane per mol polyepoxide or 0.8 ethoxy groups per hydroxyl group.

The above reaction mixture was heated for 5 hours at a maximum temperature of 150° C. During the reaction period 200 parts additional cyclohexanone was added. Analysis of the distillate showed that it contained 12.6 g. ethanol.

*Example 2.*—145 parts of an epoxide resin having an average molecular weight of 2900, an average weight per epoxide of 2000 and containing an average of 10.7 hydroxy groups per mol, 112.3 parts trimethyl ethoxy silane, 4 parts "catalyst" dissolved in 10 parts cyclohexanone, and 255 parts cyclohexanone were placed in the flask, this composition representing a ratio of 19 mols silane per mol polyepoxide or 1.6 ethoxy groups per hydroxyl group.

The above reaction mixture was heated for 15 hours at a maximum temperature of 115° C.

A film of the above product with 10% by weight urea-formaldehyde resin drawn on glass and baked 30 minutes at 200° C. showed good color retention, very good flexibility, toughness and good gloss.

*Example 3.*—200 parts of an epoxide resin having an average molecular weight of 1400, an average weight per epoxide of 897, and containing an average of 4.88 hydroxyl groups per mole, 163 parts trimethyl ethoxy silane, 4 parts "catalyst" dissolved in 6 parts cyclohexanone, and 300 parts cyclohexanone were charged into the flask, this composition representing a ratio of 9.7 mols silane per mol polyepoxide or 2 ethoxy groups per hydroxyl group. The above reaction mixture was heated for 14 hours at a maximum temperature of 132° C. At the end of the cooking period, the reaction product contained 38% non-volatile material which had a silicon content of 2.6%. The reaction product had a weight per epoxide of 1112.

A film of the above product with diethylene triamine used in proportions of one amino hydrogen per epoxy group drawn on glass and baked 30 minutes at 150° C. showed flexibility, hardness and toughness.

A film of the above product with 50% by weight urea-formaldehyde resin drawn on glass and baked 30 minutes at 200° C. showed good hardness, toughness and color retention.

A film of the above product with 10% by weight urea-formaldehyde resin drawn on glass and baked 30 minutes at 200° C. showed good flexibility, hardness, toughness and color retention.

*Example 4.*—100 parts of an epoxide resin having an average molecular weight of 2900, an average weight per epoxide of 2000, and containing an average of 10.7 hydroxyl groups per mol, 152.7 parts dimethyl phenyl ethoxy silane, 6 parts "catalyst" dissolved in 10 parts cyclohexanone, and 200 parts cyclohexanone were charged into the flask, this composition representing a ratio of 25 mols silane per mol polyepoxide or 2 ethoxy groups per hydroxyl group. The above reaction mixture was heated for 17 hours at a temperature of 161° C. At the end of the cooking period, the reaction product contained 29% non-volatile material.

A film of the above product with 15% by weight urea-formaldehyde resin drawn on glass and baked 1½ hour at 200° C. showed good flexibility.

*Example 5.*—200.8 parts trimethyl ethoxy silane, 99.0 parts of an epoxide resin having a molecular weight of approximately 791, an average weight per epoxide of 592 and containing an average of 3.39 hydroxyl groups per mole, 4 parts "catalyst" dissolved in 10 parts cyclohexanone, and 225 parts cyclohexanone were placed in the flask, this composition representing a ratio of 13.6 mols silane per mol polyepoxide or 4 ethoxy groups per hydroxyl group. The above reaction mixture was heated for 15 hour at a maximum temperature of 108° C.

*Example 6.*—241 parts trimethyl ethoxy silane, 100 parts of an epoxide resin, having an average molecular weight of 613, an average weight per epoxide of 326 and containing an average of 1.95 hydroxyl groups per mol, 3 parts "catalyst" dissolved in 6 parts cyclohexanone, and 220 parts cyclohexanone were placed in the flask, this composition representing a ratio of 12.5 mols silane per mol polyepoxide or 6 ethoxy groups per hydroxyl group. The above reaction mixture was heated for 24 hours at a maximum temperature of 116° C.

At the end of the cooking period the reaction product contained 28% non-volatile material which had a silicon content 2.2%. The reaction product had a weight per epoxide of 386.

*Example 7.*—200 parts of an epoxide resin having an average molecular weight of 1400, an average weight per epoxide of 897 and containing an average of 4.88 hydroxyl groups per mol, 600 parts cyclohexanone, 4 parts "catalyst" dissolved in 6 parts cyclohexanone, and 600 parts trimethyl ethoxy silane were placed in the flask, this composition representing a ratio of 35.5 mols silane per mol polyepoxide or 7.3 ethoxy groups per hydroxyl group. The above reaction mixture was heated for 19 hours at a maximum temperature of 115° C. The product obtained from the above reaction contained 0.093% silicon.

*Example 8.*—402 parts trimethylethoxy silane, 100 parts of an epoxide resin having an average molecular weight of 613, an average weight per epoxide of 326 and containing an average of 1.95 hydroxyl groups per mol, 4 parts "catalyst" dissolved in 6 parts cyclohexanone, and 300 parts cyclohexanone were placed in the flask. This composition represents a ratio of 20.9 mols silane per mol polyepoxide or 10 ethoxy groups per hydroxyl group. The above reaction mixture was heated for 18 hours at a maximum temperature of 121° C. The silane which distilled over was returned to the reaction vessel periodically. The reaction was terminated when no more distillate had been obtained for 20 minutes. The reaction product was a clear solution.

*Example 9.*—380 parts of epoxide resin having an average molecular weight of 1400, an average weight per epoxide of 897 and containing an average of 4.88 hydroxyl groups per mol, 4 parts "catalyst" dissolved in 6 parts cyclohexanone, and 144 parts cyclohexanone were placed in the flask. After the resin had been melted by heating the above mixture to 100° C., 20 parts dimethyl diethoxy silane was added. This composition represents a ratio of 0.498 mols silane per mole polyepoxide or 0.2 ethoxy groups per hydroxyl group.

The above reaction mixture was heated for 5 hours at a maximum temperature of 150° C. During this period 150 parts additional cyclohexanone was added. The reaction product solution had a high viscosity.

*Example 10.*—13.6 parts dimethyl diethoxy silane mixed with 25 parts cyclohexanone were placed in the flask. A solution composed of 133.3 parts epoxide resin, having an average molecular weight of 2900, an average weight per epoxide of 2000 and containing an average of 10.3 hydroxyl groups per mol, 4 parts "catalyst" dissolved in 10 parts cyclohexanone, and 266.7 parts cyclohexanone, was prepared. This composition represents a ratio of 2 mols silane per mol polyepoxide or 0.313 ethoxy groups per hydroxyl group.

On half of the above resin solution was added to the silane over a period of 4 hours while the pot temperature was held to a maximum of 148° C. The second half of the resin solution was added in one unit at the end of the 4 hour period and the reaction mixture cooked 7 hours additional at a maximum temperature of 155° C. At the end of the cooking period, the reaction product contained 30% non-volatile material.

A film of the above product with 15% by weight urea-formaldehyde resin drawn on glass and baked 12 hours at 200° C. showed good flexibility, hardness, toughness and adhesion.

*Example 11.*—25.6 parts dimethyl diethoxy silane mixed with 25 parts cyclohexanone were placed in the flask. A solution composed of 100 parts epoxide resin having an average molecular weight of 1400, an average weight per epoxide of 897 and containing an average of 4.88 hydroxyl groups per mol, 3.3 parts "catalyst" dissolved in 10 parts cyclohexanone and 200 parts cyclohexanone was prepared. This composition represents a ratio of 2.4 mols silane per mol polyepoxide or 1 ethoxy group per hydroxyl group.

The above resin solution was added to the silane solution slowly over a period of 5 hours at a maximum temperature of 140° C. The reaction mixture was cooked an additional 2 hours at a maximum temperature of 151° C. The reaction product contained 30% non-volatile material.

*Example 12.*—29.7 parts dimethyl diethoxy silane mixed with 25 parts cyclohexanone were placed in the flask. A solution containing 158.2 parts epoxide resin having an average molecular weight of 791, an average weight per epoxide of 592 and containing an average 3.39 hydroxyl groups per mol, 4 parts "catalyst" dissolved in 10 parts cyclohexanone, and 316.4 parts cyclohexanone was prepared.

The above resin solution was added to the silane solution slowly over a period of 3 hours and at a maximum temperature of 130° C. The reaction mixture was heated 8 hours additional at a maximum temperature of 154° C. At this point 29.6 parts additional dimethyl diethoxy silane was added. This represents a final ratio of 2 mols silane per mol polyepoxide or 1.2 ethoxy groups per hydroxyl group. The reaction mixture was heated 2 hours additional at a maximum temperature of 153° C. The reaction product contained 30% non-volatile material.

A film of the above product with 15% by weight urea-formaldehyde resin drawn on glass and baked 12 hours at 200° C. had good color retention.

*Example 13.*—47.8 parts dimethyl diethoxy silane mixed with 25 parts cyclohexanone were placed in the flask. A solution consisting of 100 parts epoxide resin having an average molecular weight of 759, an average weight per epoxide of 592 and containing an average of 3.39 hydroxyl groups per mol, 3.35 parts "catalyst" dissolved in 10 parts cyclohexanone, and 200 parts cyclohexanone was prepared. This composition shows a ratio of 2.6 mols silane per mole polyepoxide or 1.5 ethoxy groups per hydroxyl group.

The above resin solution was added to the silane solution gradually over a period of 3 hours and at a maximum temperature of 138° C. The reaction mixture was cooked an additional 4 hours at a maximum temperature of 153° C. At this time a slight gel formed which was easily dispersed by the addition of 50 parts cyclohexanone.

The reaction product had a non-volatile content of 26% which had a silicon content of 3.7%. The silicon content and the gain in weight of the reaction product indicated that the silane acted more as a coupling agent rather than a simple addition of one mole silane per hydroxyl group.

A film of the above product with 15% by weight urea-formaldehyde resin drawn on glass and baked 12 hours at 200° C. showed good color retention and gloss.

A film of the above product with a phthalic anhydride half ester of Dow's X-565 used in proportion of one COOH/epoxy drawn on glass and baked 6¼ hours at 425°

F. showed good gloss, flexibility, hardness, toughness, adhesion and acetone resistance.

*Example 14.*—483 parts dimethyl diethoxy silane mixed with 25 parts cyclohexanone were placed in the flask. A solution consisting of 100 parts epoxide resin having an average molecular weight of 613, an average weight per epoxide of 326 and containing an average of 1.95 hydroxyl groups per mol, 3.5 parts "catalyst" and 200 parts cyclohexanone was prepared. This composition represents a ratio of 2 mols silane per mole polyepoxide or 1.9 ethoxy groups per hydroxyl group.

The above resin solution was added to the silane solution slowly over a period of 2 hours at a maximum temperature of 140° C. The reaction mixture was cooked 12 hours additional at a maximum temperature of 154° C.

The reaction product contained 32% non-volatile material which had a silicon content of 4.2% and a weight per epoxide of 422.

A film of the above product with 15% by weight urea formaldehyde resin drawn on glass and baked 6 hours at 200° C. showed good color retention.

*Example 15.*—63.7 parts dimethyl diethoxy silane mixed with 25 parts cyclohexanone were placed in the flask. A solution consisting of 100 parts epoxide resin having an average molecular weight of 791, an average weight per epoxide of 592 and containing an average of 3.39 hydroxyl groups per mol, 3.5 parts "catalyst" dissolved in 10 parts cyclohexanone, and 200 parts cyclohexanone. This composition represents a ratio of 3.4 mols silane per mol polyepoxide or 2 alkoxy groups per hydroxyl group.

The silane solution was heated to 115° C. and slow addition of the resin solution begun. The resin solution was added over a period of 3 hours at a maximum temperature of 134° C. The reaction mixture was cooked an additional 5 hours at a maximum temperature of 151° C. At this time a slight gel formed which was dispersed by the addition of cyclohexanone. The reaction product had a non-volatile content of 25% which contained 5.1% silicon and had a weight per epoxide of 873.

A film of the above product with 10% by weight urea-formaldehyde resin drawn on glass and baked 6¼ hours at 425° F. showed good color retention, flexibility, hardness, toughness, adhesion.

A film of the above product with a phthalic anhydride half ester of Dow's X-565 used in proportion of one COOH/epoxy drawn on glass and baked 6¼ hours at 425° F. showed good gloss, flexibility, hardness, toughness, adhesion, acetone resistance and color retention.

*Example 16.*—22.2 part diphenyl diethoxy silane mixed with 25 parts cylohexanone were placed in the flask. A solution consisting of 23.6 parts epoxide resin having an average molecular weight of 1400, an average weight per epoxide of 897 and containing an average of 4.88 hydroxyl groups per mol, 2.7 parts "catalyst" and 47.2 parts cyclohexanone was prepared. This composition represents a ratio of 4.8 mols silane per mol polyepoxide or 2 ethoxy groups per hydroxy group.

The above resin solution was added to the silane solution slowly over a period of 4½ hours at a maximum temperature of 151° C. The reaction mixture was heated 2 hours at a maximum temperature of 152° C. and 1 part "catalyst" dissolved in 10 parts cyclohexanone added. The reaction mixture was heated an additional 7 hours at a maximum temperature of 161° C. The reaction mixture was reduced by a vacuum to a pressure of 25 millimeters at 50° C. to remove unreacted silane and excess solvent. The reaction product had a non-volatile content of 34% which contained 4% silicon and had a weight per epoxide of 2110.

A film of the above product with 15% by weight urea-formaldehyde resin drawn on glass and baked 3½ hours at 200° C. showed good gloss, flexibility, hardness, toughness, adhesion and color retention.

*Example 17.*—148.2 parts dimethyl diethoxy silane were placed in the flask. A solution consisting of 72.5 parts epoxide resin having an average molecular weight of 1400, an average weight per epoxide of 897 and containing an average of 4.88 hydroxyl groups per mol, 4 parts "catalyst" dissolved in 10 parts cyclohexanone and 145 parts of cyclohexanone was prepared. This composition represents a ratio of 19 mols silane per mol polyepoxide or 8 ethoxy groups per hydroxyl group.

44 parts of the above resin solution were added to the silane and the reaction mixture heated at a maximum temperature of 104° C. Additional resin solution was added to the reaction mixture at approximately one hour intervals in increments of 34 parts, 21.5 parts, 20 parts, 40 parts, 37 parts, and 35 parts. The reaction mixture was heated a total of 11 hours at a maximum temperature of 136° C. The reaction mixture was vacuum distilled to remove the unreacted silane. The reaction product had a nonvolatile content of 34% which contained 5.1% silicon and had a weight per epoxide of 1435.

A film of the above product with 30% by weight urea-formaldehyde resin drawn on glass and baked ¾ hour at 200° C. showed good gloss, hardness and color retention.

*Example 18.*—940 parts epoxide resin having an average molecular weight of 1400, an average weight per epoxide of 897 and containing an average of 4.88 hydroxyl groups per mol were placed in the flask and a continuous sparge of $CO_2$ was started. The resin was heated until melted and 60 parts amyl triethoxy silane and 90 parts diethylene glycol diethyl ether, marketed under the trade name Diethyl Carbitol by Carbide and Carbon Chemicals Company added. This composition represents a ratio of 0.38 mol silane per mol polyepoxide or 0.23 ethoxy groups per hydroxyl group. The reaction mixture was heated for an hour at a maximum temperature of 143° C. and 65 parts additional diethyl carbitol added. The reaction mixture was heated for 13 hours at a maximum temperature of 176° C.

The reaction product had a weight per epoxide of 1005-1008, an acid value of 0.2 and a viscosity of D-E at 50% solids in a solvent mixture of 15% diethylene glycol diethyl ether, marketed under the trade name Diethyl Carbitol by Carbide and Carbon Chemicals Company and 85% methyl ethyl ketone.

A solution of the product was mixed with 1% by weight based on resin solids, of $H_3PO_4$ and a 3 mil film drawn on glass. After a 30 minute bake at 200° C., the film was very tough, very flexible, very hard and showed good mar resistance.

*Example 19.*—360 parts epoxide resin having an average molecular weight of 527, an average weight per epoxide of 338 and containing an average of 2.12 hydroxyl groups per mol, 40 parts ethyl triethoxy silane and 4 parts "catalyst" dissolved in 6 parts cyclohexanone were placed in the flask. This composition represents a ratio of 0.3 mol silane per mol polyepoxide or 0.4 ethoxy groups per hydroxyl group. The reaction mixture was heated 4 hours at a maximum temperature of 204° C. A plastic reaction product which had a weight per epoxide of 367 was obtained.

*Example 20.*—340 parts epoxide resin having an average molecular weight of 613, an average weight per epoxide of 334 and containing an average of 2.12 hydroxyl groups per mol, 64 parts ethyl triethoxy silane and 2 parts para toluene sulfonic acid were placed in the flask. This composition represents a ratio of 0.6 mol silane per mol epoxide or 0.9 ethoxy groups per hydroxyl group. The reaction mixture was heated for 2 hours at a maximum temperature of 187° C. The unreacted silane was removed from the reaction mixture by vacuum distillation. The reaction product contained 98.6% nonvolatile material which had a weight per epoxide of 376.

*Example 21.*—237 parts epoxide resin having an average molecular weight of 527, an average weight per epoxide of 338 and containing an average of 2.12 hydroxyl groups per mol were placed in the flask. The reaction mixture was heated 1 hour to 93° C. and 4 parts "catalyst" dissolved in 6 parts cyclohexanone added. After another 5 minutes heating, 163 parts ethyl triethoxy silane was added. This composition represents a ratio of 1.9 mols silane per mol polyepoxide or 2.7 ethoxy groups per hydroxyl group. The reaction mixture was heated 5 hours at a maximum temperature of 174° C. The reaction product had a non volatile content of 41.4% which had a weight per epoxide of 420.

*Example 22.*—237 parts epoxide resin having an average molecular weight of 613, an average weight per epoxide of 326 and containing an average of 1.95 hydroxyl groups per mol, 163 parts ethyl triethoxy silane, and 2 parts para toluene sulfonic acid were placed in the flask. This composition represents a ratio of 2.2 mols silane per mol polyepoxide or 3.38 ethoxy groups per hydroxyl group. The reaction mixture was heated 6 hours at a maximum temperature of 165° C. The reaction product had a weight per epoxide of 445.

*Example 23.*—240 parts epoxide resin having an average molecular weight of 1400, an average weight per epoxide of 897 and containing an average of 4.88 hydroxyl groups per mol, 480 parts ethyl triethoxy silane, 480 parts cyclohexanone and 6 parts "catalyst" dissolved in 12 parts cyclohexanone were placed in the flask. This composition represents a ratio of 14.55 mols silane per mol polyepoxide or 8.96 ethoxy groups per hydroxyl group. 200 parts cyclohexanone was added after the reaction mixture had cooked 10 hours at a maximum temperature of 153° C. The reaction mixture was cooked an additional 2 hours at a maximum temperature of 151° C. The reaction product contained 22% nonvolatile material which had a weight per epoxide of 1297–1319.

A thin layer of this product baked in an aluminum foil pan 20 minutes at 400° F. was flexible and had excellent adherence to the aluminum.

*Example 24.*—180 parts epoxide resin having an average molecular weight of 1400, an average weight per epoxide of 897 and containing an average of 4.88 hydroxy groups per mol, 540 parts ethyl triethoxy silane, 8 parts "catalyst" dissolved in 12 parts cyclohexanone and 540 parts cyclohexanone were placed in the flask. This composition represents a ratio of 21.9 mols silane per mol polyepoxide or 13.56 ethoxy groups per hydroxyl group. The reaction mixture was heated 6½ hours at a maximum temperature of 151° C. The reaction product contained 19.0% nonvolatile material which had a silicon content of 6.3% and a weight per epoxide of 1380.

A film of the above product with 15% by weight urea-formaldehyde drawn on glass and baked 6 hours at 425° F. showed good color retention, hardnes, toughness, adhesion and acetone resistance.

A film of the above product with a phthalic anhydride half ester of Dow's X–565 used in proportion of one COOH/epoxy drawn on glass and baked 6¼ hours at 425° F. showed good gloss, hardness, toughness, adhesion, acetone resistance and color retention.

I claim:
1. The process of producing silane modified epoxide resins which comprises reacting by heating an epoxide resin which is a member of the group consisting of polyglycidyl ethers of polyhydric phenols and polyglycidyl ethers of polyhydric alcohols containing more than one epoxide group and at least one hydroxyl group per molecule and being free of functional groups other than hydroxyl and epoxide groups with a monomeric silane having the general formula

where $R_1$ is a member of the group consisting of alkyl and aryl groups and $R_2$, $R_3$, and $R_4$ are members of the group consisting of an alkyl, aryl, alkoxy and aroxy group and hydrogen and being free from functional groups other than alkoxy and aroxy groups.

2. The process of producing silane modified epoxide resins which comprises reacting by heating an epoxide resin which is a member of the group consisting of polyglycidyl ethers of polyhydric phenols and polyglycidyl ethers of polyhydric alcohols containing more than one epoxide group and at least one hydroxyl group per molecule and being free of functional groups other than hydroxyl and epoxide groups with a member of the group consisting of monomeric alkoxy, and aroxy silanes and being free of functional groups other than alkoxy and aroxy groups.

3. The process of claim 2 in which the reaction takes place in the presence of an acid catalyst.

4. The process of claim 3 in which the catalyst is a member of the group consisting of a styrene-acrylic acid copolymer and toluene sulfonic acid.

5. Silane modified polyepoxide resins produced according to the process of claim 2.

6. The method of producing silane modified epoxide resins which comprises reacting by heating an epoxide resin which is a member of the group consisting of polyglycidyl ethers of polyhydric phenols and polyglycidyl ethers of polyhydric alcohols containing more than one epoxide group and more than one hydroxyl group per molecule and being free of functional groups other than hydroxyl and epoxide groups with a member of the group consisting of monomeric polyalkoxy and polyaroxy silanes free of functional groups other than alkoxy and aroxy groups and in which the ratio of the alkoxy and aroxy groups per hydroxyl group is below about 4:1 and above about 6:1.

7. The process of producing silane modified epoxide resins and converting them into insoluble, infusible products which comprises reacting by heating an epoxide resin which is a member of the group consisting of polyglycidyl ethers of polyhydric phenols and polyglycidyl ethers of polyhydric alcohols containing more than one epoxide group and more than one hydroxyl group per molecule and being free of functional groups other than hydroxyl and epoxide groups with a member of the group consisting of monomeric alkoxy and aroxy silanes free of functional groups other than alkoxy and aroxy groups in the presence of a solvent, and heating the reaction product to drive off the solvent and to form a final insoluble, infusible product.

8. The process of claim 7 in which a curing agent is added to the reaction product prior to heating the same to drive off the solvent and form an infusible product.

9. The process of claim 8 in which the curing agent is a phthalic anhydride half-ester prepared by reacting one mol of

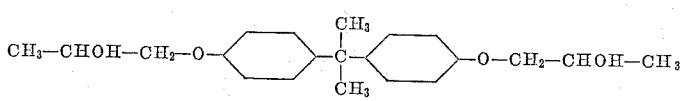

to an acid value of about 175–185 with two mols of phthalic anhydride.

10. The process of producing a silane modified epoxide resin which comprises admixing an epoxide resin which is a member of the group consisting of polyglycidyl ethers of polyhydric phenols and polyglycidyl ethers of polyhydric alcohols containing more than one epoxide group and more than one hydroxyl group per molecule and being free of functional groups other than hydroxyl and epoxide groups and a member of the group consisting of monomeric monoalkoxy and monoaroxy silanes free of functional groups other than alkoxy and aroxy groups together with a solvent, heating and distilling the mixture at such a rate that the temperature climbs slowly and distillation proceeds uniformly, and terminating the reaction where distillation ceases and equilibrium temperature is reached.

11. The process of producing silane modified epoxide resins which comprises dissolving an epoxide resin which is a member of the group consisting of polyglycidyl ethers of polyhydric phenols and polyglycidyl ethers of polyhydric alcohols containing more than one epoxide group and more than one hydroxyl group per molecule and being free of functional groups other than hydroxyl and epoxide groups in a solvent, dissolving a member of the group consisting of monomeric polyalkoxy and polyaroxy silanes free of functional groups other than alkoxy and aroxy groups in a solvent, heating the silane solution to about the temperature required to react the silane with the polyepoxide, adding slowly the polyepoxide solution to the silane solution, and distilling the mixture until distillation is complete and equilibrium temperature is reached.

12. The process of producing silane modified epoxide resins which comprises dissolving an epoxide resin which is a member of the group consisting of polyglycidyl ethers of polyhydric phenols and polyglycidyl ethers of polyhydric alcohols having more than one epoxide group and more than one hydroxyl group per molecule and being free of functional groups other than hydroxyl and epoxide groups in a solvent, heating the epoxide resin solution to about the temperature required to react the silane with the polyepoxide resin and slowly adding a member of the group consisting of monomeric monoalkoxy and monoaroxy silanes at such a rate that the temperature rises slowly, and then terminating the reaction when gel particles begin to form.

13. A composition of matter composed of the reaction product of: (A) a resinous epoxide prepared by the reaction of (1) a polyhydric phenol and (2) a compound selected from the group consisting of polyfunctional chlorohydrins and polyepoxides and mixtures thereof, said epoxide resin having an average of at least one OH per molecule, and (B) a member of the group consisting of monomeric alkoxy and aroxy silanes and being free from functional groups other than alkoxy and aroxy.

References Cited in the file of this patent
UNITED STATES PATENTS

| | | |
|---|---|---|
| 2,695,276 | Hatcher | Nov. 23, 1954 |
| 2,768,150 | Millar et al. | Oct. 23, 1956 |
| 2,843,560 | Mika | July 15, 1958 |

FOREIGN PATENTS

| | | |
|---|---|---|
| 717,408 | Great Britain | Oct. 27, 1954 |

OTHER REFERENCES

Turner et al: "Polyepoxide Resins," Paint Manufacture, September 1956, pages 321–324.

Glaser "Silicone in Protective Coatings," Ind. Eng. Chem., vol. 46, No. 11, November 1954, page 2338.

The Condensed Chemical Dictionary, 5th Ed. (1956), Reinhold Pub. Corp., N.Y. page 436.